United States Patent
Chang (10) Patent No.: US 11,213,166 B2
(45) Date of Patent: Jan. 4, 2022

(54) BARBECUE GRILL WITH A BOWL CONNECTED TO A SUPPORT STRUCTURE IN A DETACHABLE MANNER

(71) Applicant: REVOACE INC. LIMITED, Taichung (TW)

(72) Inventor: Shu-Jui Chang, Taichung (TW)

(73) Assignee: REVOACE INC. LIMITED, Taichung (TW)

( * ) Notice: Subject to any disclaimer, the term of this patent is extended or adjusted under 35 U.S.C. 154(b) by 345 days.

(21) Appl. No.: 16/443,775

(22) Filed: Jun. 17, 2019

(65) Prior Publication Data

US 2020/0390278 A1    Dec. 17, 2020

(51) Int. Cl.
*A47J 37/07* (2006.01)

(52) U.S. Cl.
CPC ..................... *A47J 37/07* (2013.01)

(58) Field of Classification Search
CPC .... A47J 37/07; A47J 37/0704; A47J 37/0713; A47J 37/0763; A47J 37/0768; A47J 37/0786; A47J 2037/0777
USPC .......... 126/9 B, 9 R, 25 R, 26, 27, 30, 39 B, 126/39 R, 41 R, 276; 99/340, 421 R, 444, 99/446, 447, 448, 449
See application file for complete search history.

(56) References Cited

U.S. PATENT DOCUMENTS

| | | | |
|---|---|---|---|
| 5,791,331 A * | 8/1998 | Stewart ............... | A47J 37/0704 126/25 R |
| 6,708,601 B2 * | 3/2004 | Home ................... | A23B 4/052 126/25 R |
| 10,694,845 B2 * | 6/2020 | Mill ..................... | A47B 88/40 |
| 2003/0230299 A1 * | 12/2003 | Bruno ................. | A47J 37/0704 126/25 R |
| 2005/0279341 A1 * | 12/2005 | Chung ................ | A47J 37/0704 126/9 R |
| 2007/0221194 A1 * | 9/2007 | Bruno ................. | F24C 3/14 126/41 R |
| 2008/0224588 A1 * | 9/2008 | Pai ..................... | A47J 37/0786 312/410 |
| 2016/0208837 A1 * | 7/2016 | Chang ................ | A47J 37/0704 |
| 2019/0313849 A1 * | 10/2019 | Yin .................... | A47J 37/0713 |

* cited by examiner

*Primary Examiner* — Hung D Nguyen
(74) *Attorney, Agent, or Firm* — Bruce Stone LLP; Joseph A. Bruce (57) ABSTRACT

A barbecue grill includes a bowl and a support structure. The bowl includes two connectors and two couplers. Each of the connectors includes an aperture. Each of the couplers includes a latch movable between an extended position and a withdrawn position. The support structure includes two positioning elements and two restraining elements. Each of the positioning elements includes a hook for insertion in the aperture of a corresponding one of the connectors. Each of the restraining elements includes an engagement fin formed with an aperture for receiving the latch of a corresponding one of the couplers in the extended position when the engagement fin is located parallel to the corresponding coupler.

10 Claims, 12 Drawing Sheets

BARBECUE GRILL WITH A BOWL CONNECTED TO A SUPPORT STRUCTURE IN A DETACHABLE MANNER

BACKGROUND OF INVENTION

1. Field of Invention

The present invention relates to a barbecue grill and, more particularly, to a barbecue grill with a bowl connected to a support structure in a detachable manner.

2. Related Prior Art

A barbecue grill includes a bowl and a support structure for supporting the bowl. Typically, the bowl and the support structure and the platform are made of metal. The bowl is connected to the support structure by rivets or welding for example. However, the bowl cannot be detached from the support structure for cleaning, maintenance or replacement. Alternatively, the bowl can be connected to the support structure by screws. However, it is not convenient to locate and use a tool to rotate the screws. Moreover, the screws might cause damages to the bowl or support structure. The tool might cause damages to the screws.

The present invention is therefore intended to obviate or at least alleviate the problems encountered in prior art.

SUMMARY OF INVENTION

It is the primary objective of the present invention to provide a barbecue grill with a bowl connected to a support structure in a detachable manner.

To achieve the foregoing objective, the barbecue grill includes a bowl and a support structure. The bowl includes two connectors and two couplers. Each of the connectors includes an aperture. Each of the couplers includes a latch movable between an extended position and a withdrawn position. The support structure includes two positioning elements and two restraining elements. Each of the positioning elements includes a hook for insertion in the aperture of a corresponding one of the connectors. Each of the restraining elements includes an engagement fin formed with an aperture for receiving the latch of a corresponding one of the couplers in the extended position when the engagement fin is located parallel to the corresponding coupler.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
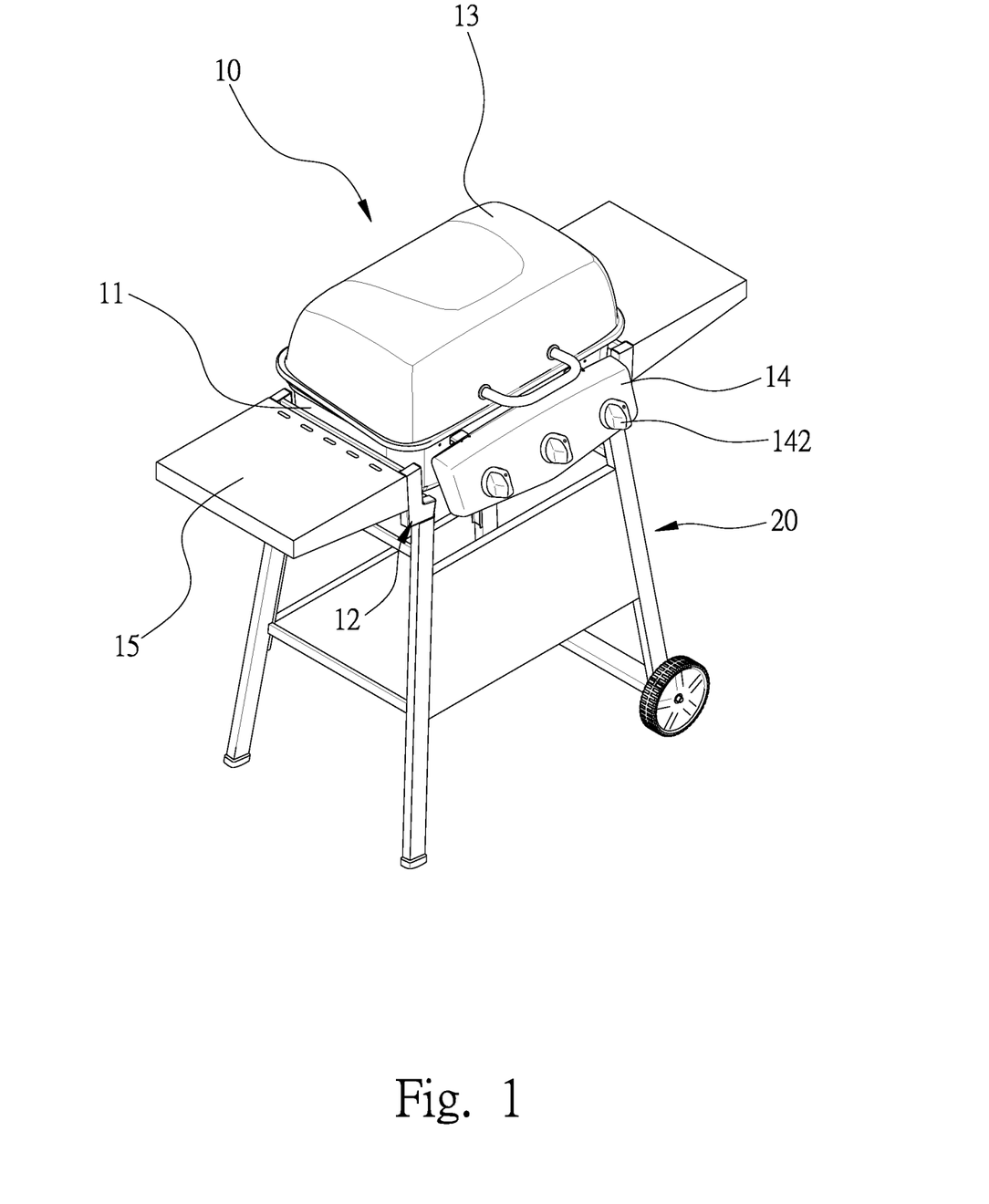
FIG. 1 is a perspective view of a barbecue grill with a bowl connected to a support structure in a detachable manner according to the preferred embodiment of the present invention.

Referring to FIG. 1, a barbecue grill 10 includes a bowl 11 connected to a support structure 20 in a detachable manner by a connecting mechanism 12 according to the preferred embodiment of the present invention. The bowl 11 includes a control panel 14 on a front portion and two platforms 15 on two lateral portions. The platforms 15 are used to support food and/or sauces for example. The control panel 14 includes knobs 142 operable to ignite and adjust temperature for cooking for example. Preferably, a cover 13 is pivotally connected to the bowl 11. The cover 13 can be laid on the bowl 11 to cover and protect food.

Figure 2:
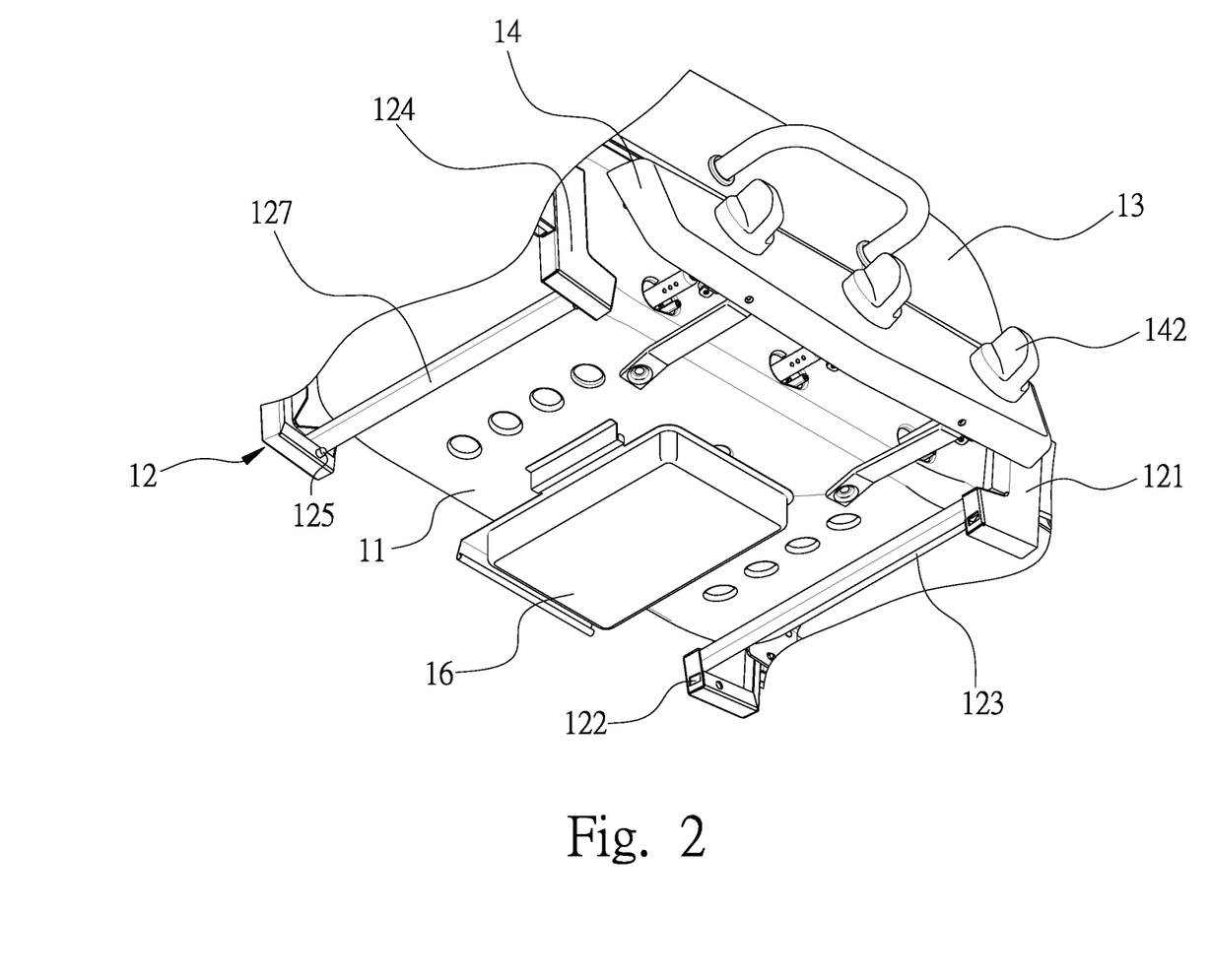
FIG. 2 is a perspective view of the bowl shown in FIG. 1.

Referring to FIG. 2, an ash tray 16 is connected to the bottom of the bowl 11 in a detachable manner. The connecting mechanism 12 is connected to the bottom of the bowl 11. In specific, the connecting mechanism 12 includes two connectors 121 connected to the left half of the bottom of the bowl 11 and two couplers 124 connected to the right half of the bottom of the bowl 11. Thus, the connectors 121 are located on a side of the ash tray 16 and the couplers 124 are located on another side of the ash tray 16.

A crossbar 123 is located between and connected to the connectors 121 to reinforce the rigidity of the connectors 121. Each of the connectors 121 includes an aperture 122. The aperture 122 allows access into the interior of the connector 121.

Figure 3:
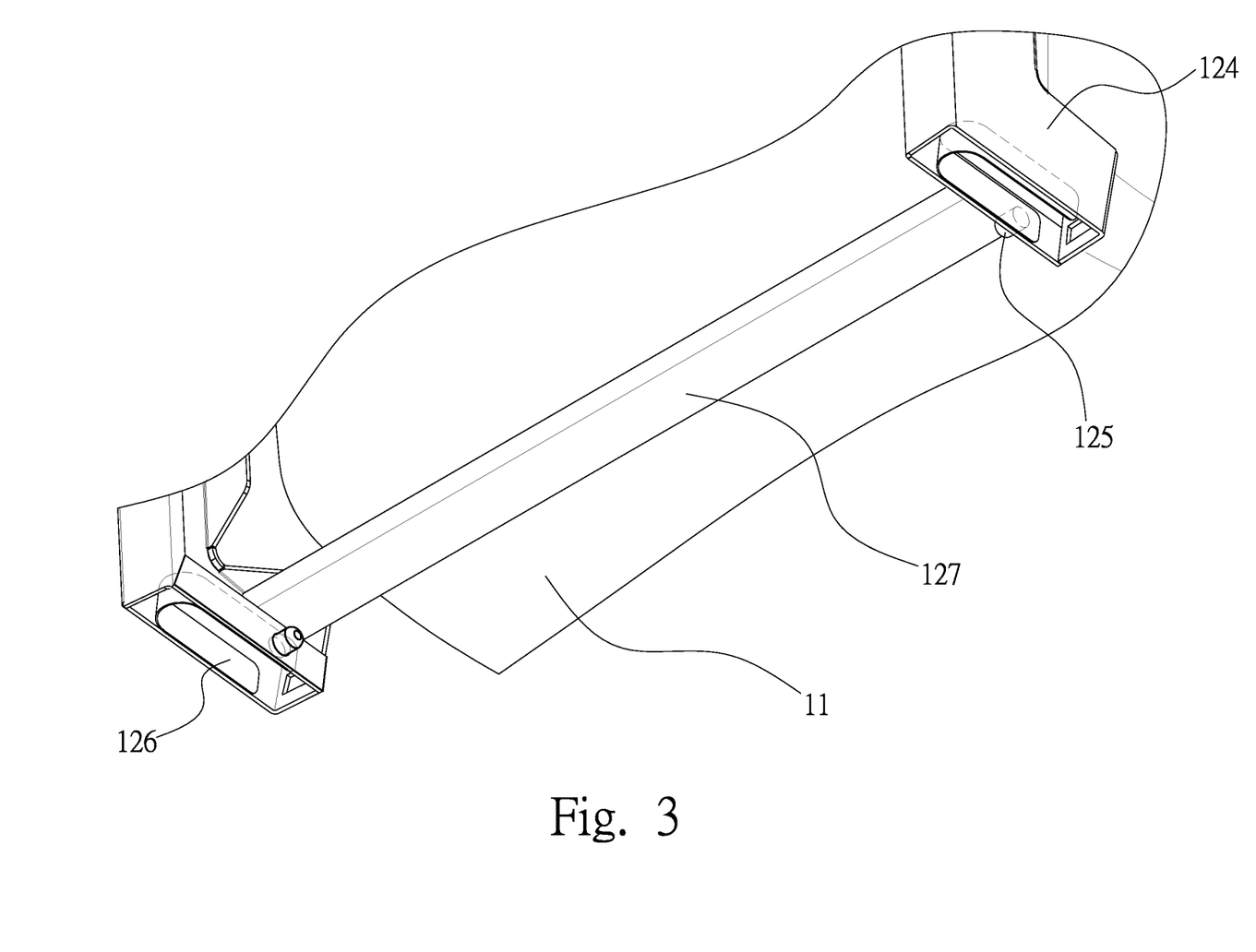
FIG. 3 is an enlarged partial view of the bowl shown in FIG. 2.

A crossbar 127 is located between the couplers 124 before the crossbar 127 is connected to the couplers 124 by welding to increase the rigidity of the couplers 124. Each of couplers 124 includes a latch 125 and a leaf spring 126 (FIG. 3). The latch 125 includes a first section inserted in the coupler 124, which is hollow, and a second section biased out of the coupler 124 by the leaf spring 126. The leaf spring 126 extends in an arc and hence includes a section in contact with an internal face of the couplers 124 and another section connected to the first section of the latch 125.

Figure 4:
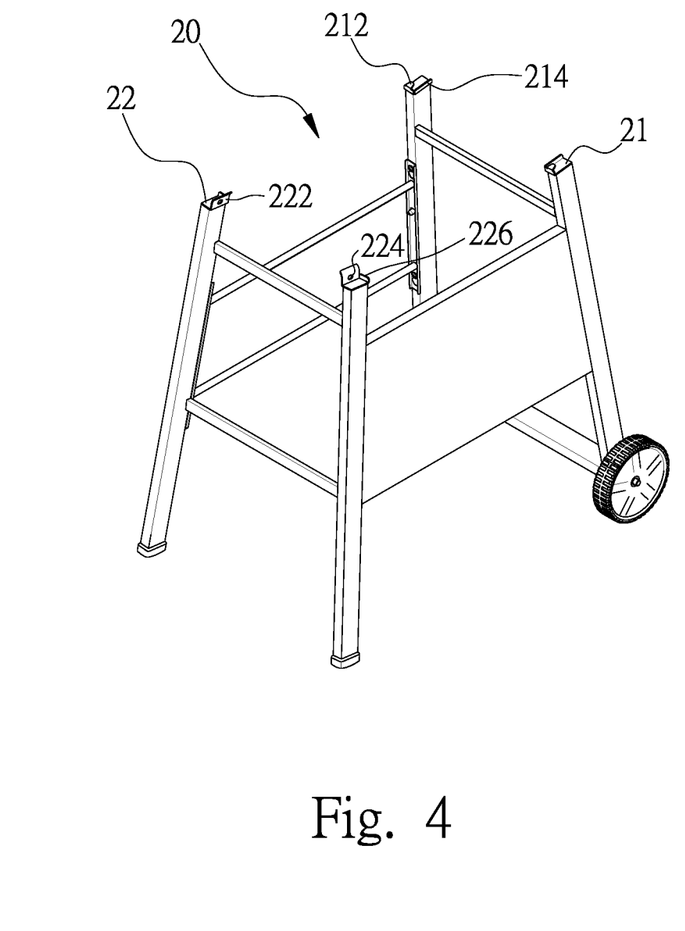
FIG. 4 is a perspective view of the support structure shown in FIG. 1.

Referring to FIG. 4, the support structure 20 includes two left posts (not numbered) and two right posts (not numbered). A positioning element 21 is connected to the top of each of the right posts. The top of each of the right posts is rectangular face. The positioning element 21 includes a hook 212 and a restraining portion 214. The hook 212 is formed on a side of the top of each of the right posts. The restraining portion 214 is formed on an adjacent side of the top of each of the right posts.

A restraining element 22 is connected to the top of each of the left posts. The top of each of the left posts is rectangular face. The restraining element 22 includes an engagement fin 222 and a restraining portion 226. The engagement fin 222 is formed on a side of the top of each of the left posts. The restraining portion 226 is formed on an adjacent side of the top of each of the left posts. The engagement fin 222 is formed with an aperture 224.

Figure 5:
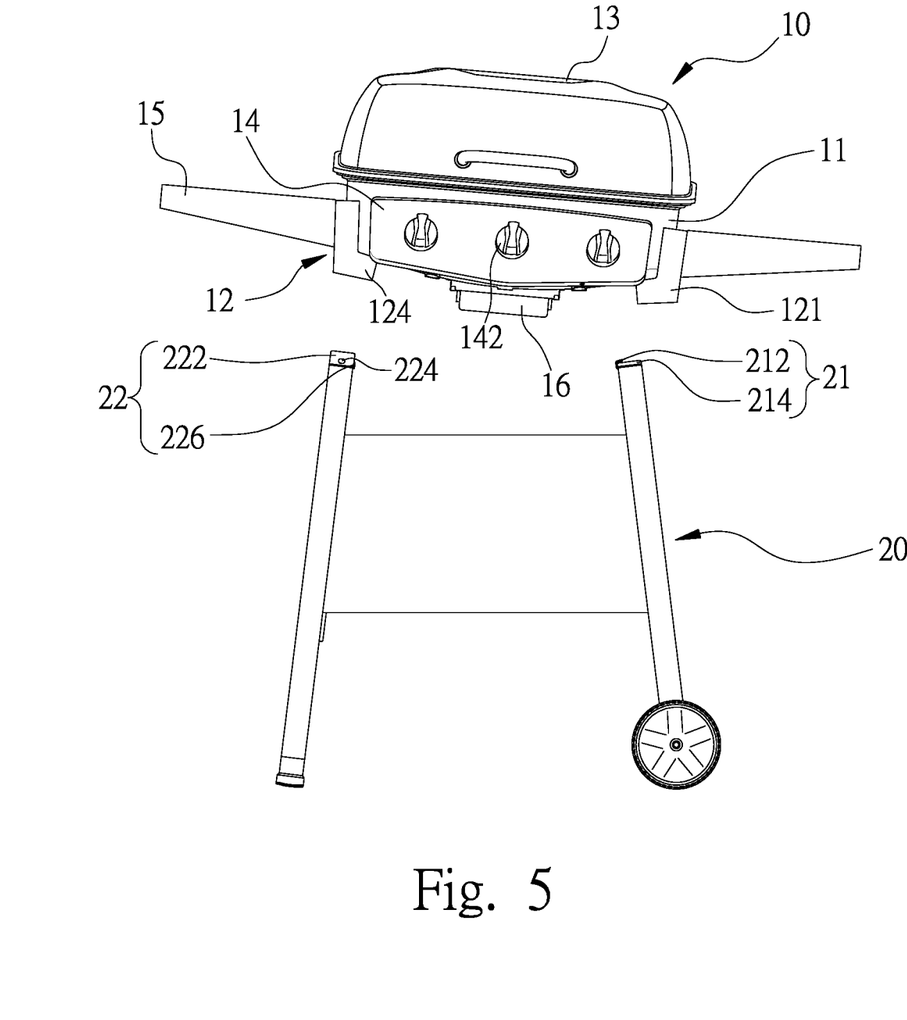
FIG. 5 is a front view of the barbecue grill shown in FIG. 1 before the bowl is connected to the support structure.

Referring to FIG. 5, to connect the bowl 11 to the support structure 20, at first, the bowl 11 is located above the support structure 20. The connectors 121 are located above the positioning elements 21. The couplers 124 are located above the restraining elements 22.

Figure 6:
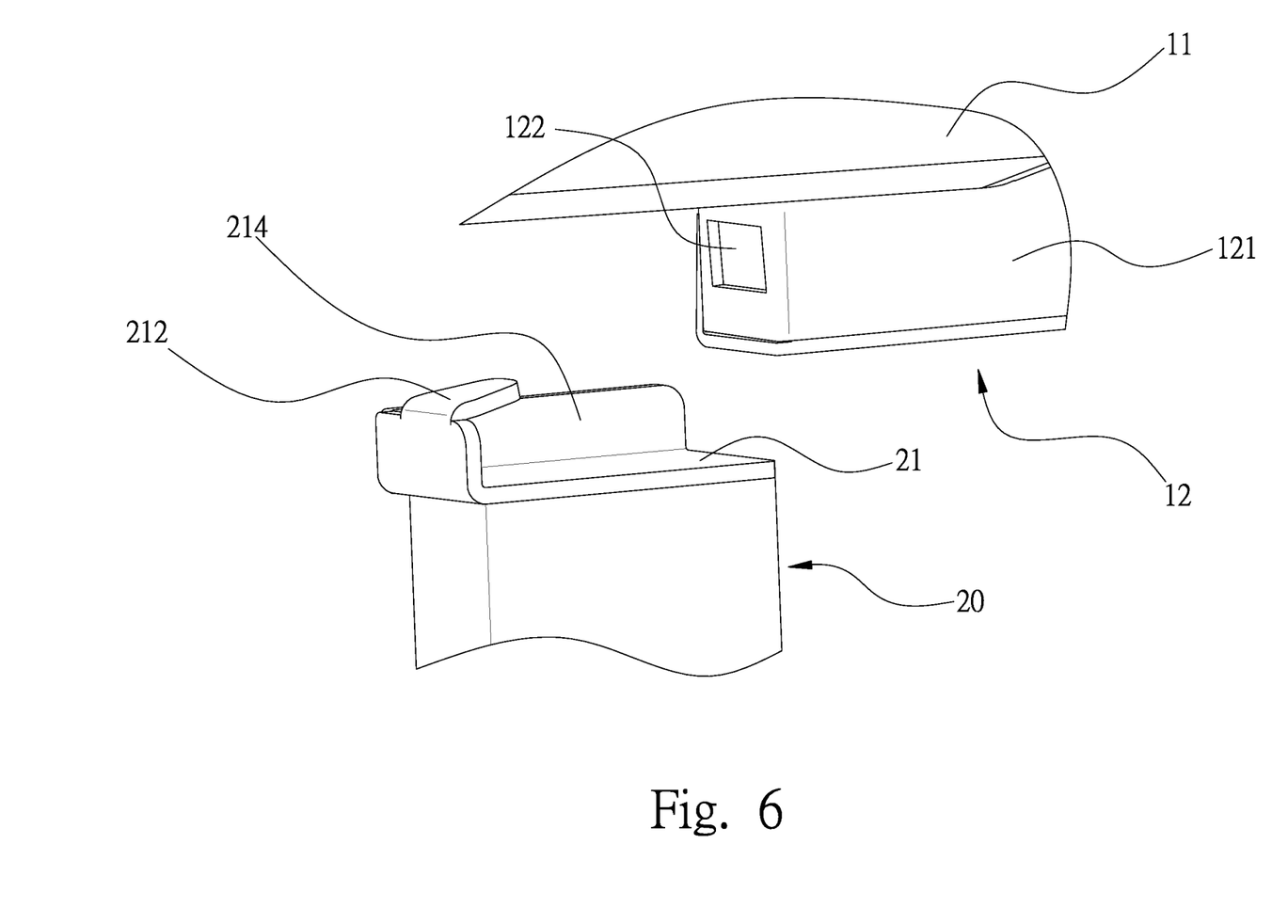
FIGS. 6 through 9 are enlarged views of a connecting mechanism of the barbecue grill shown in FIG. 1 in various positions.
Figure 7:
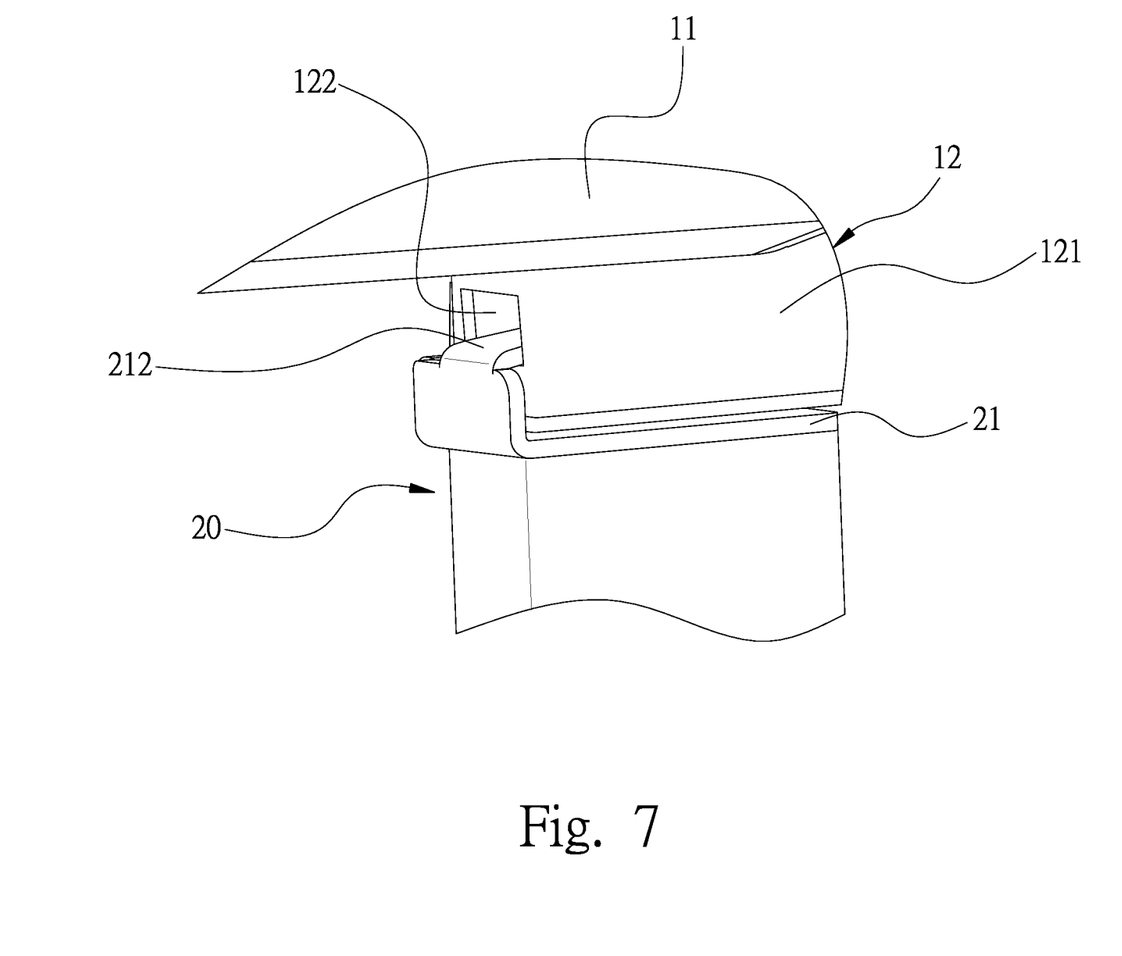

Referring to FIGS. 6 and 7, one of the connectors 121 and the corresponding positioning element 21 are shown. The connector 121 is located in the vicinity of the positioning element 21 before the hook 212 is inserted into the connector 121 through the aperture 122. The hook 212 and the restraining portion 214 prevent the connector 121 from movement toward the center of the support structure 20.

Figure 8:
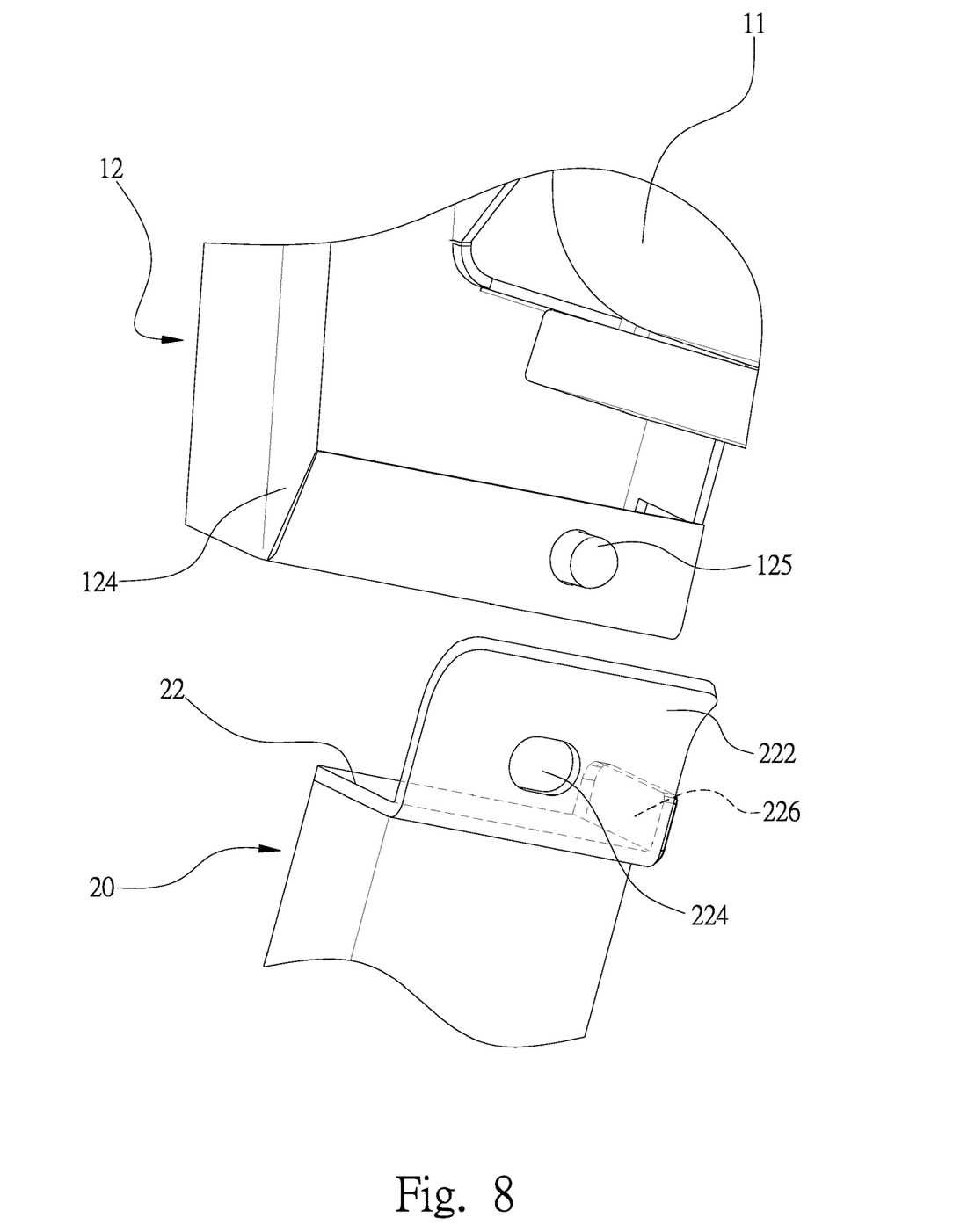
Figure 9:
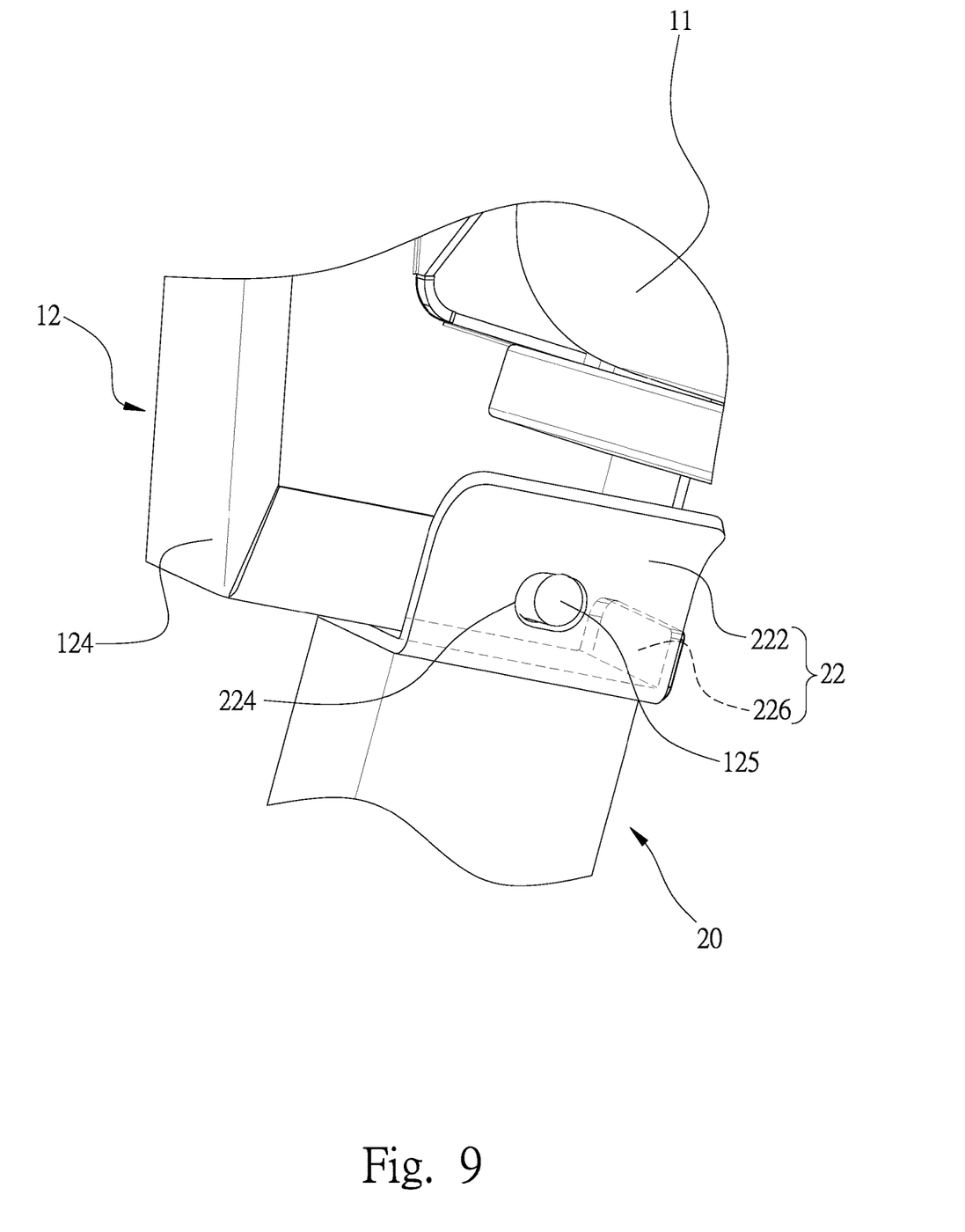

Referring to FIGS. 8 and 9, one of the couplers 124 and the corresponding restraining element 22 are shown. The bowl 11 is moved toward the support structure 20 so that the coupler 124 is moved toward the restraining element 22. The latch 125 is brought into contact with an arched portion of the engagement fin 222 before the latch 125 is pushed into the coupler 124 by the engagement fin 222 to allow further movement of coupler 124 toward the restraining element 22. Finally, the latch 125 is inserted into the aperture 224 and the coupler 124 is supported on the restraining element 22. The coupler 124 is kept on the restraining element 22 due to the insertion of the latch 125 in the aperture 224. The engagement fin 222 and restraining portion 226 prevent the coupler 124 from movement toward the center of the support structure 20.

Referring to FIGS. 6 through 9, the latch 125 is withdrawn into the coupler 124, thereby removing the latch 125 from the aperture 224 and hence allowing the couplers 124 to leave the restraining element 22. Then, the hook 212 is removed from the aperture 122 of the connector 121 so that the connector 121 is moved away from the positioning element 21. Thus, the bowl 11 is efficiently and effectively detached from the support structure 20.

Figure 10:
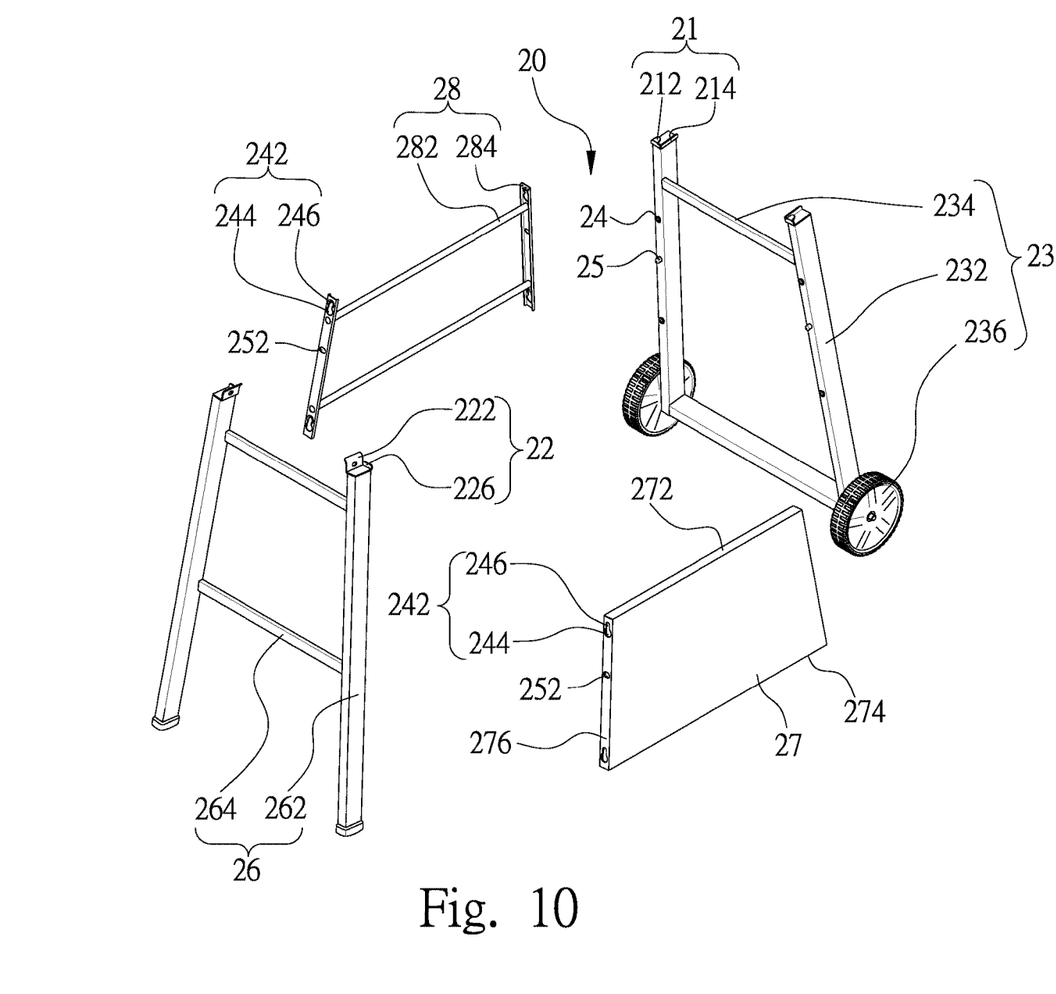
FIG. 10 is an exploded view of the support structure shown in FIG. 1.

Referring to FIG. 10, the support structure 20 includes a wheel assembly 23, a strut assembly 26, a plate 27 and a frame 28. The wheel assembly 23 is connected to the strut assembly 26 via the plate 27 and the frame 28.

The wheel assembly 23 includes two posts 232, two connecting rods 234 and two casters 236. The connecting rods 234 are located between the posts 232 before the connecting rods 234 are connected to the posts 232 by welding for example. Each of the casters 236 is connected to the bottom (or "lower end") of a corresponding one of the posts 232. Each of the positioning elements 21 is connected to the top (or "upper end") of a corresponding one of the posts 232. Thus, the hooks 212 are connected to the wheel assembly 23. Each of the posts 232 is provided with two holding elements 24 and a boss 25. Each of the holding elements 24 is preferably a screw with a threaded portion inserted in the corresponding post 232 and an enlarged head located out of the corresponding post 232. The boss 25 is located between the holding elements 24.

The strut assembly 26 includes two posts 262 and two connecting rods 264. The connecting rods 264 are located between the posts 262 before the connecting rods 264 are connected to the posts 262 by welding for example. Each of the restraining elements 22 is connected to the top (or "upper end") of a corresponding one of the posts 262. Thus, the engagement fins 222 are connected to the strut assembly 26. Each of the posts 262 is provided with two holding elements 24 and a boss 25.

The plate 27 is a trapezoidal plate with bent edges, i.e., an upper edge 272, a lower edge 274 and two lateral edges 276. Each of the lateral edges 276 is made with two apertures 242 and a slot 252. Each of the apertures 242 includes a large portion 244 and a small portion 246. The diameter of the large portion 244 is larger than the diameter of the heads of the holding elements 24. The diameter of the small portion 246 is smaller than the diameter of the heads of the holding elements 24 but larger than the diameter of the threaded portions of the holding elements 24. The slot 252 is located between the apertures 242.

Figure 11:
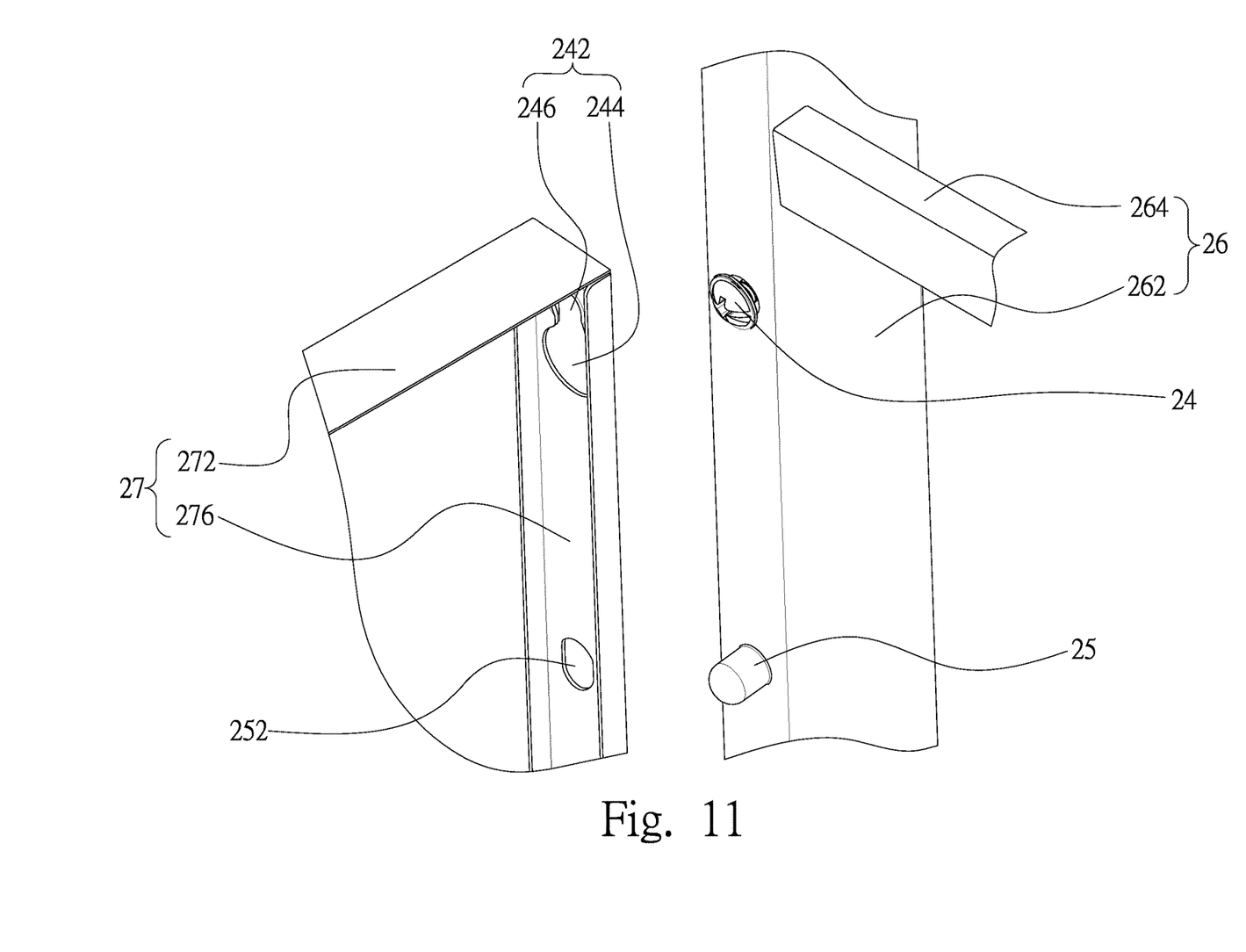
FIGS. 11 and 12 are enlarged partial views of the support structure shown in FIG. 10 in various positions.
Figure 12:
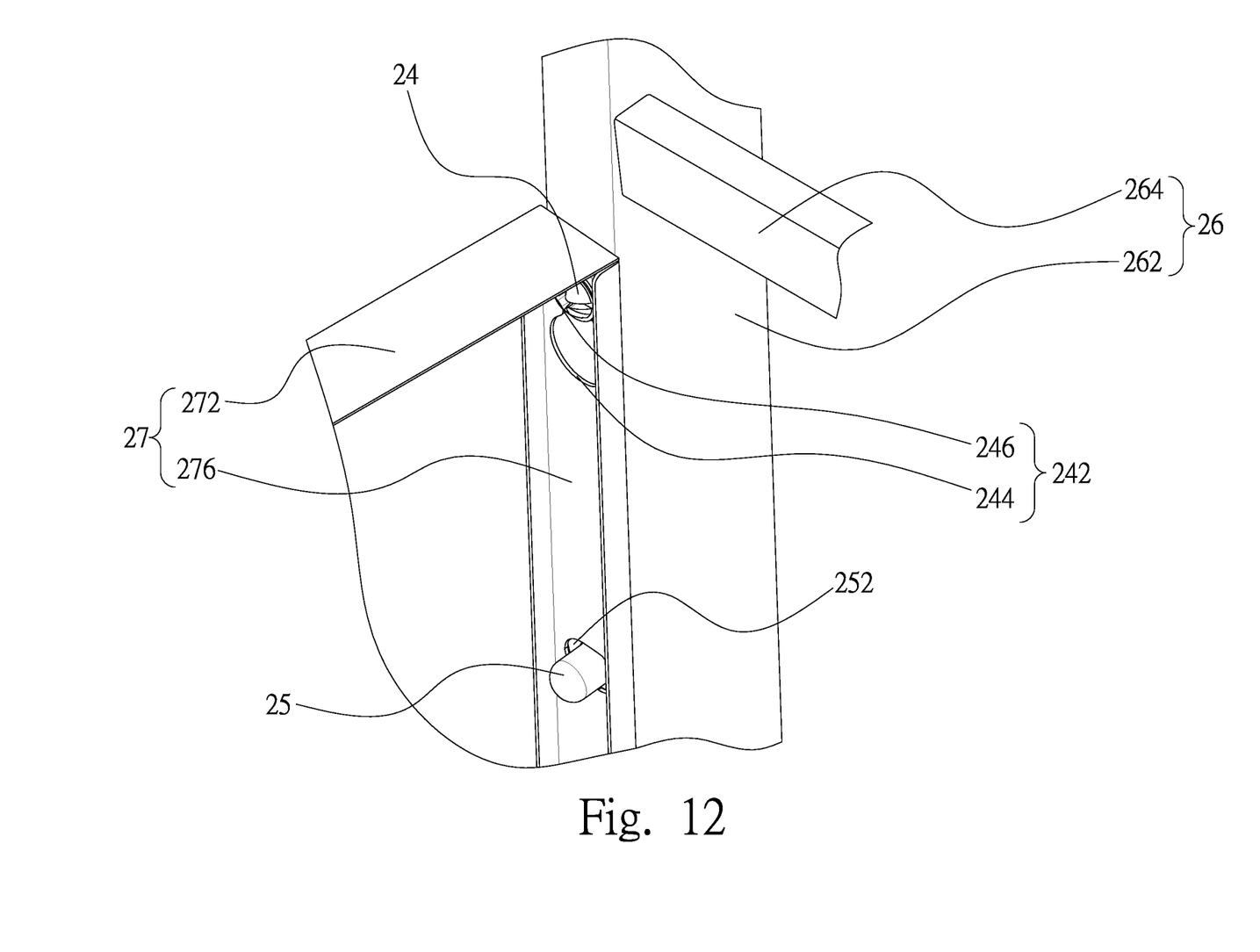

Referring to FIGS. 11 and 12, one of the lateral edges 276 of the plate 27 is located near one of the posts 232, and the other lateral edge 276 of the plate 27 is located near one of the posts 262. Then, the heads of the holding elements 24 are in the large portions 244 of the apertures 242. At the same, the bosses 25 are inserted in the slots 252 of the lateral edges 276. Then, the plate 27 is lowered so that the threaded portions of the holding elements 24 are inserted in the small portions 246 of the apertures 242. Therefore, the plate 27 is efficiently connected to the wheel assembly 23 and the strut assembly 26.

The shape of the frame 28 is like the shape of the plate 27. The frame 28 includes two rods 282 and two strips 284. The rods 282 are made of different lengths. The rods 282 are located between the strips 284 before the rods 282 are connected to the strips 284 by welding for example. Each of the strips 284 includes two apertures 242 and a slot 252. The apertures 242 of the strips 284 receive the holding elements 24 of the other posts 232 and 262, and the bosses 25 of the strips 284 receive the bosses 25 of the same. Hence, the frame 28 is efficiently connected to the wheel assembly 23 and the strut assembly 26.

Referring to FIGS. 2, 4 and 10, the aperture 122, the latch 125, the hook 212 and the engagement fin 222 together form the connecting mechanism 12. The apertures 122 of the connectors 121 can be replaced with the latches 125 of the couplers 124, without affecting the efficiency in using the connecting mechanism 12 for connection and disconnection. Similarly, the hooks 212 can be provided on the posts 262 of the strut assembly 26 instead of on the posts 232 of the wheel assembly 23, and the engagement fins 222 can be provided on the posts 232 instead of on the posts 262, without affecting the efficiency in connecting the bowl 11 to the support structure 20 or disconnecting the bowl 11 from the support structure 20.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A barbecue grill comprising:
   a bowl comprising:
   two connectors each of which comprises an aperture; and
   two couplers each of which comprises a latch movable between an extended position and a withdrawn position; and
   a support structure comprising:
   two positioning elements each of which comprises a hook for insertion in the aperture of a corresponding one of the connectors; and
   two restraining elements each of which comprises an engagement fin formed with an aperture for receiving the latch of a corresponding one of the couplers in the extended position when the engagement fin is located parallel to the corresponding coupler.

2. The barbecue grill according to claim 1, wherein each of the positioning elements comprises a restraining portion abutted against the connectors when the hooks are inserted in the apertures of the connectors to keep the bowl in position relative to the support structure.

3. The barbecue grill according to claim 2, wherein the hook and the restraining portion are located at two edges of an upper end of each of the positioning elements.

4. The barbecue grill according to claim 1, wherein each of the restraining elements comprises a restraining portion abutted against a corresponding one of the couplers when the engagement fins receive the latches to keep the bowl in position relative to the support structure.

5. The barbecue grill according to claim 4, wherein the engagement fin and the restraining portion are located at two edges of an upper end of each of the restraining elements.

6. The barbecue grill according to claim 1, wherein the support structure comprises a wheel assembly, a strut assembly, a plate for interconnecting the wheel assembly and the strut assembly, and the strut assembly a frame for interconnecting the wheel assembly and the strut assembly.

7. The barbecue grill according to claim 6, wherein each of the wheel assembly and the strut assembly comprises holding elements each of which comprises a head and a neck, and each of the plate and the frame comprises apertures each of which comprises a large portion via which the head of a corresponding one of the holding elements is inserted and a small portion for trapping the neck of the corresponding holding element.

8. The barbecue grill according to claim 7, wherein each of the holding elements is a screw comprising a threaded portion inserted in one of the wheel assembly and the strut assembly.

9. The barbecue grill according to claim 7, wherein each of the wheel assembly and the strut assembly comprises bosses, and each of the plate and the frame comprises slots for receiving the bosses.

10. The barbecue grill according to claim 6, wherein the positioning elements are located at one of the wheel assembly and the strut assembly, and the restraining elements are located at the remaining one of the wheel assembly and the strut assembly.

* * * * *